US006243676B1

United States Patent
Witteman (10) Patent No.: US 6,243,676 B1
(45) Date of Patent: Jun. 5, 2001

(54) SEARCHING AND RETRIEVING MULTIMEDIA INFORMATION

(75) Inventor: Bradley James Witteman, San Mateo, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/221,334

(22) Filed: Dec. 23, 1998

(51) Int. Cl.[7] ............................. G10L 15/06; G10L 3/08
(52) U.S. Cl. ..................... 704/243; 704/251; 704/270; 704/271; 704/260
(58) Field of Search ............................ 704/271, 272, 704/276–278, 251, 231, 201, 243, 260

(56) References Cited

U.S. PATENT DOCUMENTS

| | | | |
|---|---|---|---|
| 5,664,060 | * | 9/1997 | Jarrett et al. ........................... 704/270 |
| 5,737,725 | * | 4/1998 | Case ..................................... 704/260 |
| 5,774,857 | * | 6/1998 | Newlin .................................. 704/271 |
| 5,809,471 | * | 9/1998 | Brodsky ................................ 704/275 |

OTHER PUBLICATIONS

Hauptmann et al. ("Story Segmentation and Detection of Commercials in Broadcast News Video," International Forum on Research and Technology Advances in Digital Libraries, Apr. 1998).*
Wactlar et al ("Intelligent Access to Digital Video: Informedia Project," Carnegie Mellon University, Computer magazine, May, 1996).*
Placeway et al. ("Cheating with Imperfect Transcripts," International Conference on Spoken Language, Oct 1996).*
Gibbon ("Generating Hypermedia Documents from Transcriptions of Television Programs using Parallel Text Alignment," International Workshop on Research Issues in Data Engineering, Feb. 1998).*

* cited by examiner

Primary Examiner—Tālivaldis I. Šmits
Assistant Examiner—Daniel A. Nolan
(74) Attorney, Agent, or Firm—Fish & Richardson P.C.

(57) ABSTRACT

A method retrieves a multi-media segment from a signal stream having an audio component and a closed caption component. This includes separating the audio component and the closed caption text component from the signal stream, generating an audio pattern representative of the start of the multi-media segment, locating the audio pattern in the audio component, and temporally aligning the text from the closed caption text component with the audio pattern in the audio component. Locating the audio pattern in the audio component includes retrieving text from the closed caption text component; and comparing the text against one or more keywords delimiting the multi-media segment. Once located, the multi-media segment may be played on-demand. In addition, an apparatus retrieves a multi-media segment from a signal stream, the signal stream having an audio component and a closed caption text component. The apparatus includes a decoder for separating the audio component and the closed caption text component from the signal stream, an audio synthesizer coupled to the decoder for generating an audio pattern representative of the start of the multi-media segment, a pattern recognizer coupled to the decoder and to the audio synthesizer for locating the audio pattern in the audio component, and an aligner coupled to the pattern recognizer and to the decoder for temporally aligning the text with the audio pattern in the audio component. The apparatus also plays the multi-media segment on-demand.

30 Claims, 10 Drawing Sheets

*Prior Art*

SEARCHING AND RETRIEVING MULTIMEDIA INFORMATION

BACKGROUND

The invention relates to searching and retrieving multimedia information.

Rapid advances in computer technology have resulted in an explosion of electronically accessible information. For instance, virtually any information imaginable is available on information sources such as specialized databases and servers. The information can be accessed from the convenience of the user's computer, or may be accessed using a telephone which can relay information and allow their users to respond quickly to various situations. The advent of wireless telephones has further allowed users access to information regardless of the user's proximity to a telephone jack.

The availability of these information sources renders information, formerly hard to manage and retrieve, readily accessible. To date, the advantages associated with the widespread availability of electronic data have not been fully realized due to a variety of reasons. For instance, not all information is stored or available in the same format so that the information can be easily searched. This situation occurs when information is stored variously as video clips, sound files and text files. More particularly, information such as sound cannot be searched using conventional text search commands. Moreover, certain perishable and high value-added information such as news on business, sports, current events and entertainment are best presented in audio-visual form and multimedia form rather than text form. Yet, such sources of audio-visual/multimedia information can be prolific and can strain the processing and data storage capacity of a computer hosting such information. Examples of prolific sources of audio-visual/multimedia information include television feeds, cable feeds, radio feeds, and computer generated multimedia feeds.

SUMMARY OF THE INVENTION

In one aspect, a method is disclosed for retrieving a multi-media segment from a signal stream having an audio component and a closed caption component. The method includes separating the audio component and the closed caption component from the signal stream; generating an audio pattern representative of the start of the multi-media segment; locating the audio pattern in the audio component; and temporally aligning the text with the audio pattern in the audio component.

Implementations of the invention include one or more of the following. The method includes retrieving text from the closed caption component; and comparing the text against one or more keywords delimiting the multi-media segment. The keywords may delimit the start and the end of the multi-media segment, or may be stored in a dictionary. The method may compare the text against one or more key characters delimiting the multi-media segment. The key characters may be stored in a dictionary. The method may include generating a concluding audio pattern representative of the end of the multi-media segment; and locating the concluding audio pattern in the audio component. The method may identify the multi-media segment between the audio patterns. The multi-media segment and text may be indexed in a database. The multi-media segment may be played on-demand.

In another aspect, an apparatus retrieves a multi-media segment from a signal stream, the signal stream having an audio component and a closed caption component. The apparatus includes means for separating the audio component and the closed caption component from the signal stream; means for generating an audio pattern representative of the start of the multi-media segment; means for locating the audio pattern in the audio component; and means for temporally aligning the text with the audio pattern in the audio component.

Implementations of the invention include one or more of the following. The apparatus may include means for retrieving text from the closed caption component; and means for comparing the text against one or more keywords delimiting the multi-media segment. The keywords may delimit the start and the end of the multi-media segment. The keywords may be stored in a dictionary. A means for comparing the text against one or more key characters delimiting the multi-media segment may be provided. The key characters may be stored in a dictionary. The apparatus may include means for generating a concluding audio pattern representative of the end of the multi-media segment; and means for locating the concluding audio pattern in the audio component. A means for identifying the multi-media segment between the audio patterns may be used. The multi-media segment and text may be indexed in a database. The apparatus may include a means for playing the multi-media segment on-demand.

In a third aspect, an apparatus retrieves a multi-media segment from a signal stream, the signal stream having an audio component and a text component. The apparatus includes a decoder for separating the audio component and the text component from the signal stream; an audio synthesizer coupled to the decoder for generating an audio pattern representative of the start of the multi-media segment; a pattern recognizer coupled to the decoder and to the audio synthesizer for locating the audio pattern in the audio component; and an aligner coupled to the pattern recognizer and to the decoder for temporally aligning the text with the audio pattern in the audio component.

Implementations of the invention include one or more of the following. The apparatus may include an extractor for retrieving text from the closed caption component; and a comparator for checking the text against one or more keywords delimiting the multi-media segment. The keywords may delimit the start and the end of the multi-media segment. A dictionary may store the keywords. The text may be compared against one or more key characters delimiting the multi-media segment. A character dictionary may store the key characters. The synthesizer may generate a concluding audio pattern representative of the end of the multi-media segment and the pattern recognizer locates the concluding audio pattern in the audio component. A database may store the multi-media segment between the audio patterns and the text.

In another aspect, a method for retrieving a multi-media segment from a signal stream, the signal stream having an audio component and a text component, includes generating audio patterns representative of the start and the end of the multi-media segment; locating the audio patterns in the audio component; and delimiting a portion of the audio component between the audio patterns as the multi-media segment.

Implementations of this aspect may include temporally aligning the text with the start of the delimited audio component portion; and storing the text and the delimited audio component portion in a database.

In another aspect, a computer system includes a plurality of interdependent processors, each interdependent processor executing an independent operating system image without sharing file system state information. Each interdependent processor has a network access card with a first network connection and a second network connection; and each interdependent processor has a decoder for separating the audio component and the text component from the signal stream; an audio synthesizer coupled to the decoder for generating an audio pattern representative of the start of the multi-media segment; a pattern recognizer coupled to the decoder and to the audio synthesizer for locating the audio pattern in the audio component; an aligner coupled to the pattern recognizer and to the decoder for temporally aligning the text with the audio pattern in the audio component; and a database coupled to the aligner for storing the audio component with the aligned text. Each processor is connected to a first active backplane and to a second active backplane, the second active backplane operating in lieu of the first active backplane in case of a fail-over; and one or more peripherals connected to each of the first and second active backplanes and responsive to data requests transmitted over the first and second active backplanes.

Advantages of the invention include one or more of the following. The invention allows value-added information such as news on business, sports, current events and entertainment to be accessible from the user's computer or telephone. The response to the user's request is a natural sounding playback, in contrast to conventional text-to-speech (TTS) technologies whose outputs are stilted, mechanical and unnatural sounding. Moreover, the invention allows time intensive information, or information that requires the user to listen for extended periods of time, to be delivered smoothly and without interruptions. Further, the invention requires little computational power and is inexpensive to implement.

The invention also provides scalability and fault tolerance in delivering the value-added information. The invention allows many servers to perform the same task in an active/active scalable manner. The invention also supports load balancing among a pool of like servers. By providing a client process with access to a pool of like servers which are load balanced, the invention keeps the response time for each request to a minimum. Thus, the invention supports high data availability, fast access to shared data, and low administrative costs through data consolidation. Additionally, the invention may be built using standard off-the-shelf components to reduce overall system cost.

DESCRIPTION

Figure 1:
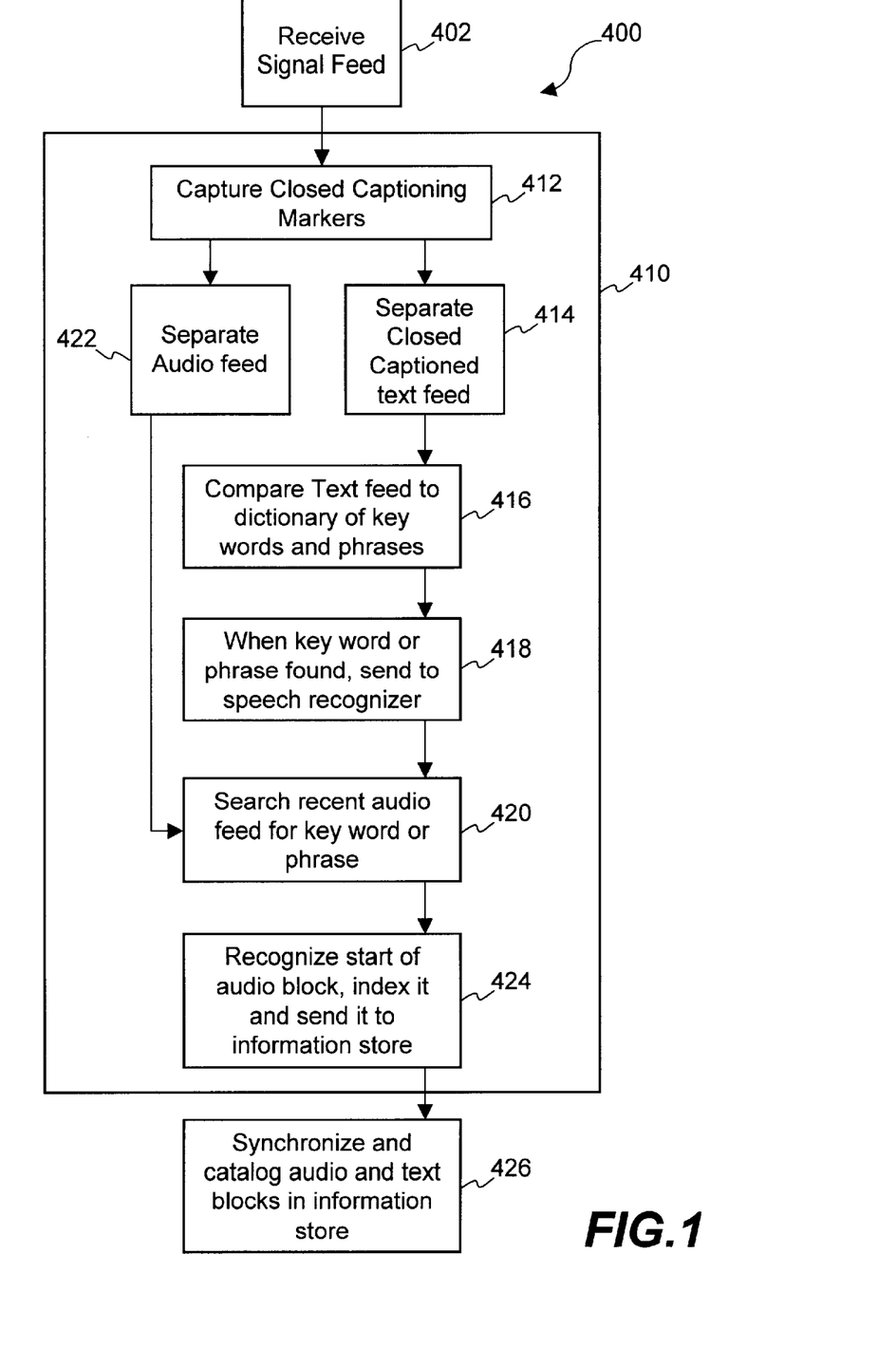
FIG. 1 is a flow chart illustrating a process for processing a multimedia segment with reference to closed captions.

Referring now to FIG. 1, a process 400 for finding cue points delineating a start and an end of a multimedia segment is shown. Generally, the process 400 separates an audio component and a closed caption component from the signal stream. An audio pattern representative of the start of the multi-media segment is generated and the audio pattern is located in the audio component. The process then temporally aligns the text with the audio pattern in the audio component.

In the embodiment of FIG. 1, the multimedia segment is delivered over a television feed. Alternatively, a radio feed, a cable feed, or a computer generated multimedia feed can be used in lieu of the television feed.

Initially, the television feed is received (step 402). The television feed includes an audio feed and a text feed. The text feed can be a caption, or a written representation of the audio feed. The caption is similar to a subtitle and is designed to allow hearing-impaired listeners to enjoy the program. In this case, the caption is used to determine the start and the end of the multimedia segment.

Figure 2A:
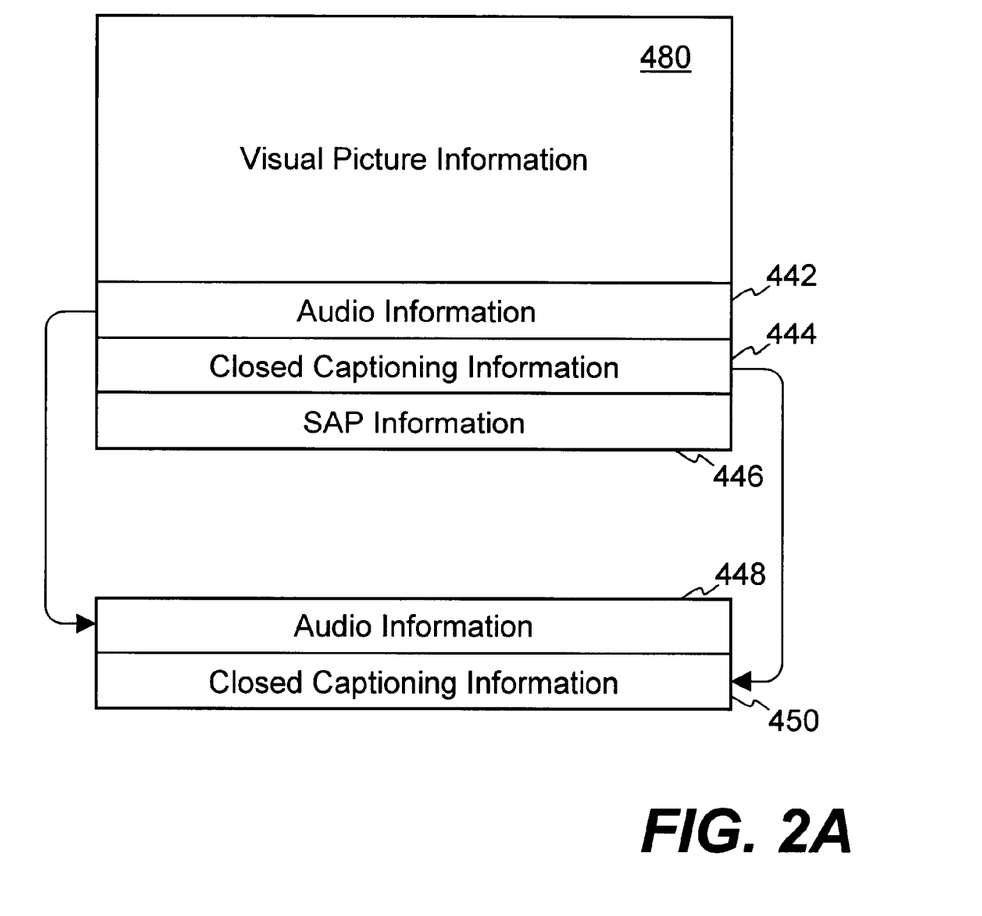
FIG. 2A is a diagram illustrating components of the multimedia segment.
Figure 2B:
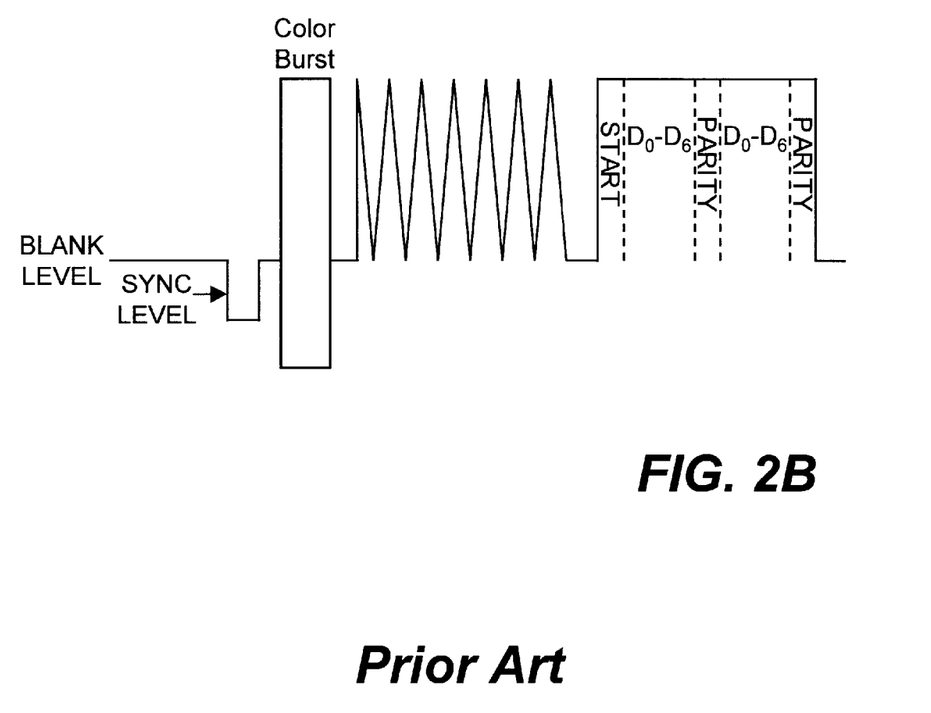
FIG. 2B is an example of a multimedia signal containing closed-caption character data.

A signal from the television feed, an example of which is shown in FIG. 2B, is analyzed and closed caption data is extracted (step 412). Closed caption data is hidden in line 21 of a vertical blanking interval (VBI), which is the part between video frames and includes a number of lines of video. Captions 1 and 2 and texts 1 and 2 are stored in line 21 of the first field in each frame, while the second field's line 21 can be used for captions 3 and 4 and texts 3 and 4.

The closed caption text feed is then separated (step 414). The text feed is compared to a dictionary of key words and phrases (step 416). When a keyword or phrase is found, the keyword or the phrase is sent to a voice recognizer (step 418). The speech recognizer then searches recent audio feeds for the same keyword or phrase (step 420).

Concurrently, the audio feed is separated (step 422). From step 422, the audio feed is provided to the voice recognizer of step 420. The process 400 then determines a start of the audio block, indexes the audio block and sends the audio block to an information store (step 424). Finally, the information store synchronizes the catalogs audio and text blocks (step 426). Steps 412–424 collectively form a block 410 which is processed inside a computer such as the computer of FIG. 6.

In sum, the television feed enters the system and is separated into audio and text feeds. The text feed is compared to a dictionary of known marker words and phrases such as "CNN Headlines Sports", for example. Once a word or phrase has been identified, the word or phrase is sent to the speech recognizer to search recent audio feeds for that word or phrase. When the word or phrase is detected in the audio feed, the audio block is indexed and sent to the information store. The voice recognizer system is then instructed to look for the key word or phrase that signals the end of the audio feed. The text and audio feeds are then synchronized, indexed and stored in the information store awaiting user recall or system use.

In this manner, the process of FIG. 1 tracks the closed caption content while trying to match text to a dictionary of key words and phrases. The matched key words and phrases are extracted and sent to the voice recognizer. Sound information associated with the key words or phrases is compared against a buffered version of the audio feed. The sound feed and text feed are then aligned. The result is a synchronized audio and text streams, even if the original audio and text (closed-caption) information were originally out of synch. Since the text feed is searchable and aligned with the audio feed, the user can search for the item of interest and can either read the text feed or listen to the audio feed.

The speech recognizer of step 418 is discussed next. This recognizer applies the current text feed from the closed caption information with the two dictionaries mentioned above. The recognizer performs the following functions:

Recognize intersections between the closed caption information and the dictionaries;

Process the text key words/phrases and find the corresponding audio block; and

Store the corresponding text key words/phrases and audio block in the information store.

The recognizer looks for an intersection between the current text string and entries in the dictionary of significant words, phrases and characters. When there is an intersection, it creates an open entry state or a close entry state. The open entry state is entered when the intersection exists with the matching record in the information store being closed. The close entry state is entered when the intersection exists with the current record being open.

Pseudo code for the open entry state is as follows:
i. Speech recognizer finds the target word or phrase identified by the search software in the audio feed;
ii. Index entry into the database underlying the information store uniquely identifying this data block;
iii. Record the audio and associated text information into the information store;
iv. Reset the speech recognizer to look for the expected closing entry (or if there is no closing entry that is related to the opening entry, the system looks for indicators such as dead air, commercial break, and another intersection between text feed and dictionary, among others.

Pseudo code for the close entry state is as follows:
i. The audio and related text information is recorded into the information store;
ii. The speech recognizer finds the target word or phrase identified by the search software in the audio feed; and
iii. A closing entry is made into the information store to signify the end of the current data block.

Delivery software that is able to search and retrieve a specific data block by the data block's unique identifier which will reflect the content type, and the date and time of the data block. The delivery agent will then send this data block to the user's phone or their SMS/Alphanumeric pager at the user's request or according to a preset schedule.

The content type of the text information and corresponding audio data is identified by various words/phrases or significant characters recognized in the dictionaries. The dictionary of significant characters include those characters that are used to delineate the closed caption feed such as a triple carat (>>>) to signify the beginning of a story. The word/phrase dictionary includes words and/or phrases commonly used to separate programming segments. Examples from CNN Headline News include "CNN Headline Sports" which relates to breaking sports news; "CNN Dollars and Sense" which relates to breaking financial news; and "CNN Headline News" which relates to breaking current events. The recognizer, when it encounters a match, creates an entry into the database that uniquely identifies the data by the content type, date encountered and time encountered. Thus, the recognizer continually compares the textual information from the closed caption feed to the dictionary of words and phrases, as well as the dictionary of significant characters.

Various information delivery modes are discussed next. The user can request on demand information using a voice user interface on a telephone. When the delivery agent is instructed by the user to deliver information to the user, the agent looks for the most recent data block associated with the requested content type. The delivery agent may also send this information to the user at specific times according to a user defined profile.

When the user verbally requests specific information (i.e. "Read me the sports news") the system will search the information store for the most recent data block that corresponds with that definition. When it encounters the correct information, the responsive audio content is streamed to the telephone for the user to listen.

Alternatively, on demand information can be determined from a user defined profile. The user can configure their agent to send them specific information in text format to either a SMS phone or an alphanumeric pager at scheduled times. Further, on demand information can be requested from a web interface. The user of the system can also access the text information stored within the information store via the web page and personalized agentry.

A breakdown of various components contained in a clip of multimedia presentation such as television is shown in FIG. 2A. Since video information is bandwidth intensive, a block 440 containing visual picture information consumes the bulk of the available bandwidth represented in FIG. 2A. A block 442 representing audio information, a block 444 representing closed caption information and a block 446 representing SAP information collectively require less bandwidth than the visual picture information block 480.

As shown at the bottom of FIG. 2A, the process of FIG. 1 isolates the audio information block 442 and the closed caption information block 444 and reproduces an audio information block 448 and a closed caption information block 450.

FIG. 2B shows a representative multimedia signal such as a television signal containing closed-caption character data. Closed caption data is preceded by a sine wave analogous to color burst (called the "Clock Run-In") and three "start bits" that are always "0", "0", and "1". The sine wave typically lasts for about seven clock cycles. Two bytes of data, using seven bits, odd parity format, are possible on a given line. Using only Line 21, Field 1, of the VBI, a delivery rate of about 3600 characters or 500 words per minute can be achieved.

Figure 3:
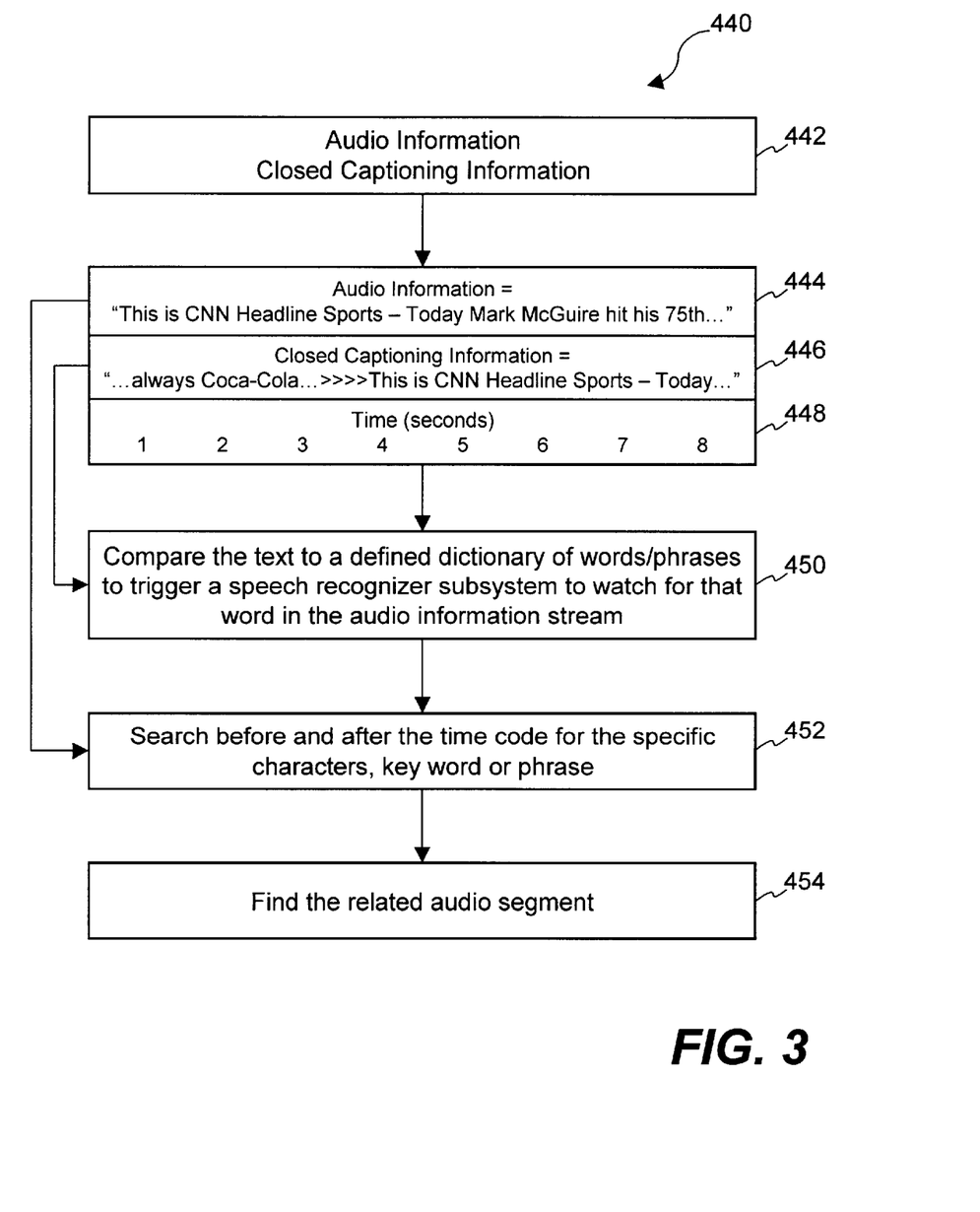
FIG. 3 is a flow chart illustrating a process for aligning the closed-caption character data with a multimedia segment.

FIG. 3 shows a diagram illustrating the operation of an alignment process 440. Initially, the audio information block 448 and the closed caption information block 450 of FIG. 2A are captured (step 442). Next, the audio information is isolated (step 444). The closed caption information is also separated (step 446). At this stage, the audio information of step 444 and the closed caption information of step 446 may be out of sync. A slight delay generally exists between the audio and closed caption feeds in live shows such as CNN Headline News and ESPN, among others. This artifact is due to real time transcription of these events. In this example, the audio information may correspond to a current sentence "This is CNN Headline Sports" while the closed caption still references a portion of the previous sentence. Thus, the closed caption is delayed and shifted out of alignment at time 4 (step 448).

To help compensate for this delay between the audio and text feeds, the closed caption information is used as a "flag" for a voice recognizer that will look for a specific block of dialog. For example, the "Headline Sports" lead in and lead out from each sports news segment. This audio marker allows the process of FIG. 1 to automatically capture the audio segment without cropping the beginning or end of it because of the closed caption delay.

The closed caption is watched by an agent software which compares the caption text to a defined dictionary of words and/or phrases. The agent looks for specific characters, such as ">>>" delineating the start of a new program segment and/or specific words or phrases such as "CNN Headline Sports," for example. These specific characters or words and phrases trigger the voice recognizer to watch for that word in the audio information (step 450).

After the voice recognizer has been instructed to watch for the appropriate words in the stream of audio information, the voice recognizer searches approximately before and after the time code where it encountered the specific characters, keyword or phrase (step 452). In this particular example, the voice recognizer starts to look for audio segments that correspond to the target text stream "CNN Headline Sports" at about time 3. From step 452, the voice recognizer then finds the related audio segment at time 1 (step 454).

The related audio segment may be determined by creating an index entry for the audio file, sending the synchronized audio and text data stream to the information store, restarting the voice recognizer to look for the ending queue and, when that queue is defined, the data block is complete. The data block is then indexed and inserted into the information store. This audio block is cached on the information store for subsequent use.

Generally, when the user requests news to be delivered to him or her for reading, the text associated with the closed caption data can be pushed as a text message to the user's SMS service or alphanumeric pager. Although the text message can be added to previous news text messages, the current text message may override the previous day's text message to prevent filling the user's mail box with stale, outdated news items.

Alternatively, when the user requests news to be played for him or her, multimedia information such as an audio segment associated with the closed caption data can be pushed as an audio message to the user's telephone or sound board if he or she is using a computer.

Although the text or audio message can be added to previous news messages, the current text or audio message may override the previous day's messages to prevent filling the user's mail box with stale, outdated news items. Moreover, if the user has configured the system to have the news refreshed on a periodic basis such as monthly, weekly, hourly or on demand based on a trigger event, the text block is automatically refreshed.

Figure 4:
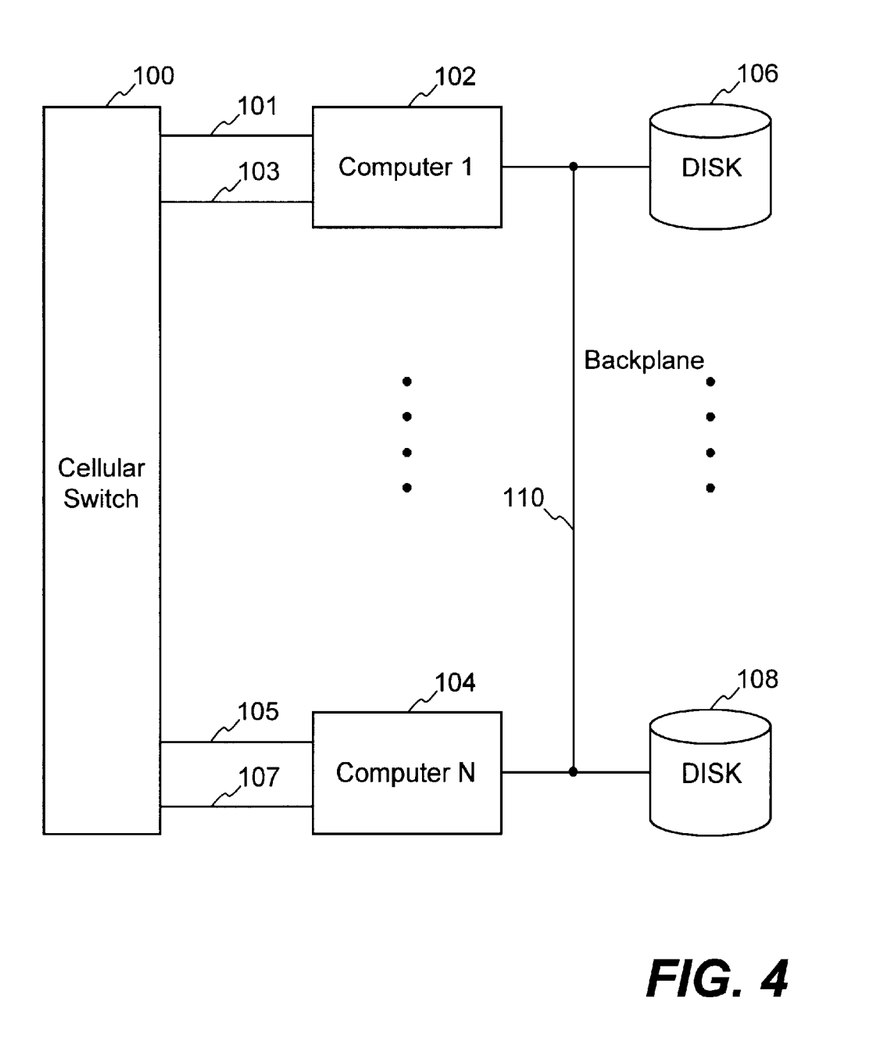
FIG. 4 is a block diagram illustrating a first computer system for processing multimedia segments.

FIG. 4 shows a computer system in accordance with the present invention. Telephone calls from a plain old telephone service (POTS) network are received by a cellular switch 100. The cellular switch 100 transfers the telephone calls to a plurality of computers 102 and 104 over multiple T1 line pairs 101–103 and 105–107.

The interface to the cellular switch 100 at each of T1 line pairs 101 & 103 through 105 & 107 receives analog voice signal from the network, bandpass-filters and conditions the signal by the line interface and then applies the signal to a CODER/DECoder (CODEC) circuit. The CODEC filters, samples, and digitizes the inbound analog audio signal and passes this digitized audio signal for subsequent digital signal processing (DSP). For outbound data, the interface expands stored, compressed audio data for playback; adjusts the volume and rate of speed of playback upon application or user request; and generates tones such as DTMF, MF, or any application-defined general-purpose tone as needed.

Each of computers 102 and 104 communicates with each other over an active backplane 110. Additionally, multiple data storage devices 106 and 108 are also connected to the active backplane 110. The active backplane 110 may be an Ethernet switch such as a Cisco 2900 switch, available from Cisco Systems, Inc. of San Jose, Calif. The active backplane 110 optimizes the Ethernet network by dividing it into multiple smaller, more efficient collision domains, or segments. Individual segments created by the active backplane 110 can consist of one computer, like a file server, a group of computers, or even the entire business network. The active backplane 110 provides point to point bi-directional communication among many nodes such that each node has a full bandwidth access to the data storage device 106 or 108. Each of data storage devices 106 and 108 is a network Redundant Array of Independent Disk (RAID) data storage system. Each network RAID data storage system 106 or 108 connects directly to the active backplane 110. The network RAID data storage system may be a RAID array available from Network Appliances, Inc. which attaches directly to an Ethernet backplane 110 such as a 10 Mbit, a 100 Mbit, or a 1 Gbit Ethernet backplane 110.

The network RAID data storage devices 106 or 108 includes a redundant RAID controller and is fully fault tolerant. As such, the network RAID data storage device 106 or 108 is a collection of disks under hardware or software control such that a single drive failure does not bring the system of FIG. 4 down. The network RAID data storage device 106 or 108 also guards against fan and power failures and provides remote failure notification.

Each of data storage devices 106 and 108 may be a RAID-1 system, in which every disk has a mirror image of its data stored on another disk. Alternatively, the data storage devices 106 and 108 may be a RAID-2 or RAID-3 sub-system which stripes user data across a group of data drives (typically four or eight drives per group). The data storage devices 106 and 108 may also be a RAID-4 or RAID-5 sub-system which stripes block (or sometimes groups of blocks) of data and stores the data entirely on an individual disk. Additionally, the operating system running on each data storage device 106 or 108 is optimized for file operations and has a thread-based non-preemptive multitasking environment. Data requests are transmitted over the active backplane 110 in accordance with a file sharing protocol, which is a special set of rules for communicating between a requester running on the computer 102 or 104 and the network RAID data storage system 106 or 108 so that client applications in a computer may read and write to files on the network RAID data storage system 106 or 108. Further, applications may request services from server programs in a computer network. Through the file sharing protocol, an application can access files at a remote server as well as other resources, including printers, mailslots, and named pipes, to read, create, and update files on the remote server. The protocol can also communicate with any server program that is set up to receive a client request.

The file sharing protocol includes the Common Internet File System (CIFS) for Microsoft-based systems or the Network File System (NFS) for Unix-based systems. Alternatively, the file sharing protocols may be the Server Message Block (SMB) protocol, which is used over the Internet on top of its TCP/IP protocol or on top of other network protocols such as IPX or NetBEUI. The file sharing protocol supported by the RAID data storage device 106 or 108 provides a locking facility which may be a file locking facility or a byte-range locking facility. The locking facility enhances data integrity for the file sharing environment of FIG. 4. Locking can be used to coordinate concurrent access to a file by multiple applications and users. It can prevent concurrent readers and writers of shared data from reading "stale" data (i.e., data currently in the process of being updated by another application) and/or overwriting each others' updates.

In file locking, the application requests that all other applications/users be denied read access to the file while the application holds the file open. If another application should attempt to try to open the file for reading (or reading and writing) while the file is already open with this deny-mode, the attempt fails. Alternatively, byte-range locking may be used to restrict other applications' access to sections of an open file, usually while the holder of the byte-range lock is intending to read or write the locked section. In certain implementations, byte-range locks can be obtained only on already open files.

For interprocessor communications, a Messaging system is provided with a unified mailbox containing message pointer lists and reference counts. The CIFS file system lock and application real-time programming processes such as open, lock, update, close are provided for each application requiring access to the mailbox. Lock management and disk allocation strategy is handled by the CIFS file system running on the RAID controller 106 or 108. In this way, each application telephony server and electronic mail server can operate on the messaging system directly without the need of a single threaded file or database server. Thus, maximum scalability is supported.

Moreover, the CIFS protocol automatically frees locks if a network connection is lost after some programmable period of time. Any computer 102 or 104 in the system illustrated in FIG. 4 can fail regardless of the locks it has outstanding and not affect the operation of any other computer that wants to operate on the same data. Hence, each computer or node in the cluster can operate on the entire file system independent of the state or operation of other nodes.

Figure 5:
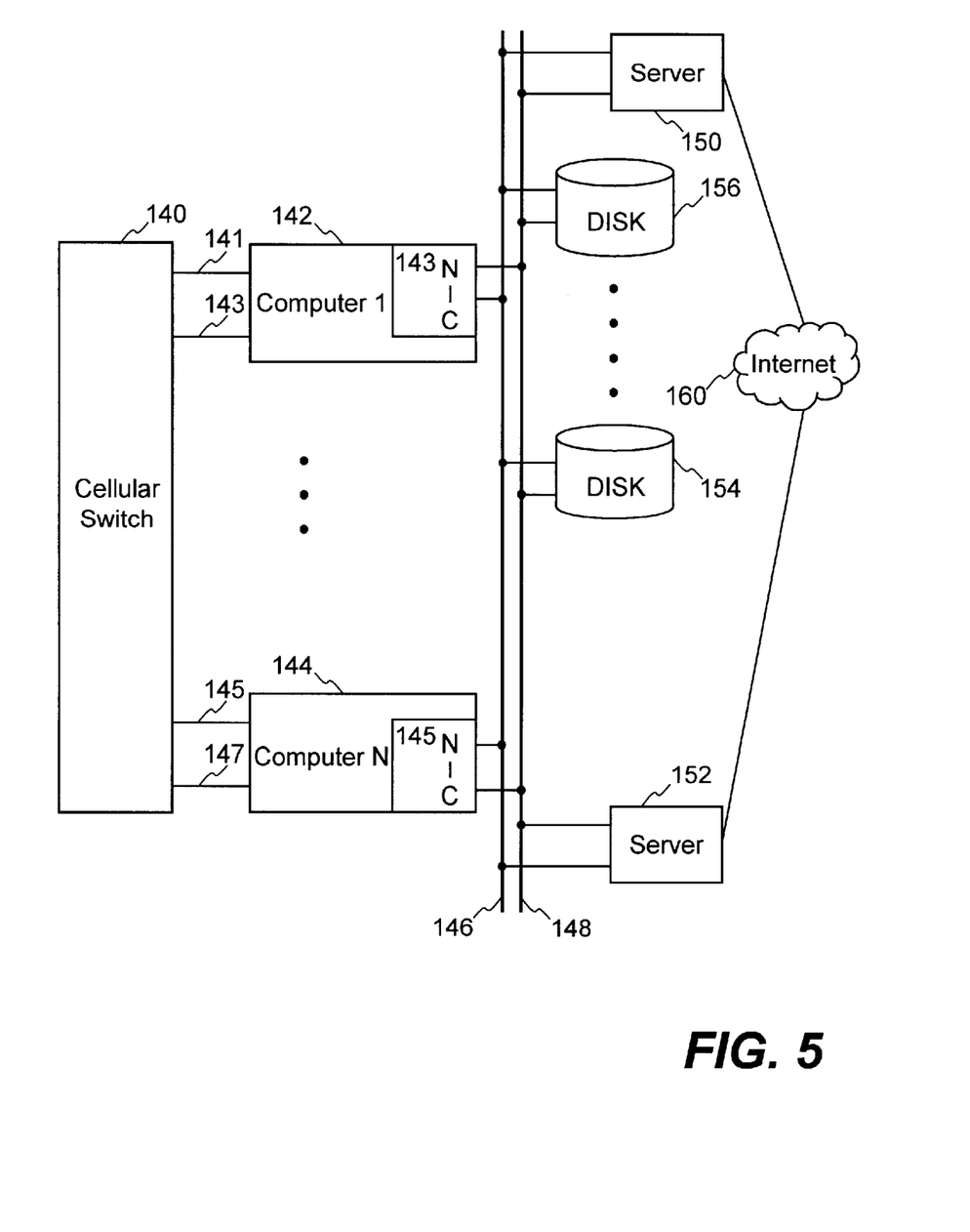
FIG. 5 is a block diagram illustrating a second computer system for processing multimedia segments.

FIG. 5 shows a second computer system with redundant backplanes. As in the system of FIG. 4, voice data from the POTS network is presented to a cellular switch 140. The cellular switch 140 in turn distributes the incoming calls to a plurality of computers 142 and 144. The cellular switch 140 communicates with each of computers 142 and 144 over multiple T1 lines 141 & 143 through 145 & 147, respectively. The computers 142 and 144 in turn communicate with each other and with other peripheral devices over a redundant backplane with a first active backplane 146 and a second active backplane 148. The first and second active backplanes 146 and 148 are connected together.

Each of the active backplanes 146 and 148 may be an Ethernet switch such as the Cisco 2900 switch. The backplanes 146 and 148 divide the Ethernet network into multiple smaller, more efficient collision domains, or segments. Each backplane 146 or 148 provides point-to-point bidirectional communication among computers 142–144 such that each computer has a full bandwidth access to the shared peripherals such as data storage devices 154 and 156. Instead of transmitting information to every device on the network and creating unnecessary traffic, each backplane 146 or 148 determines the exact destination for the data and transmits it only to the port where that device is attached. Each backplane 146 or 148 can also handle multiple transmissions at one time. In the system illustrated in FIG. 5, when one computer sends information destined for another device on the network, the backplane 146 or 148 determines exactly where the data needs to go and creates a temporary connection between the two computers. This connection is a private link that is established only for the time needed to complete the data transmission. Also, unlike shared Ethernet hubs, the backplane 146 or 148 allows multiple simultaneous telephone calls to be handled, thus increasing overall network performance. The backplanes 146 and 148 also provide redundancy in bus access. The use of the redundant backplanes 146 and 148 thus provides scalability for both processor-to-processor communication (as in node-to-node communication) and for processor-to-I/O communication (as in the case of a network-attached RAID device). The processor-to-memory communication bandwidth limitation is obviated by the fact that nodes in a cluster provide processor-to-memory access within the node and do not require LAN access.

Also connected to the active backplanes 146 and 148 are servers 150 and 152. The servers 150 and 152 in turn are connected to the Internet 160. Additionally, multiple network data storage devices 154 and 156 are also connected to the active backplanes 146 and 148 to satisfy data requests from computers 142 and 144 or servers 150 and 152.

The dual backplanes 146 and 148 provide scalability and fault tolerance. Further, multiple servers may perform the same task in an active/active scalable manner. By providing a client process with access to a pool of like servers which are load balanced, the response time for each request is optimized.

Figure 6:
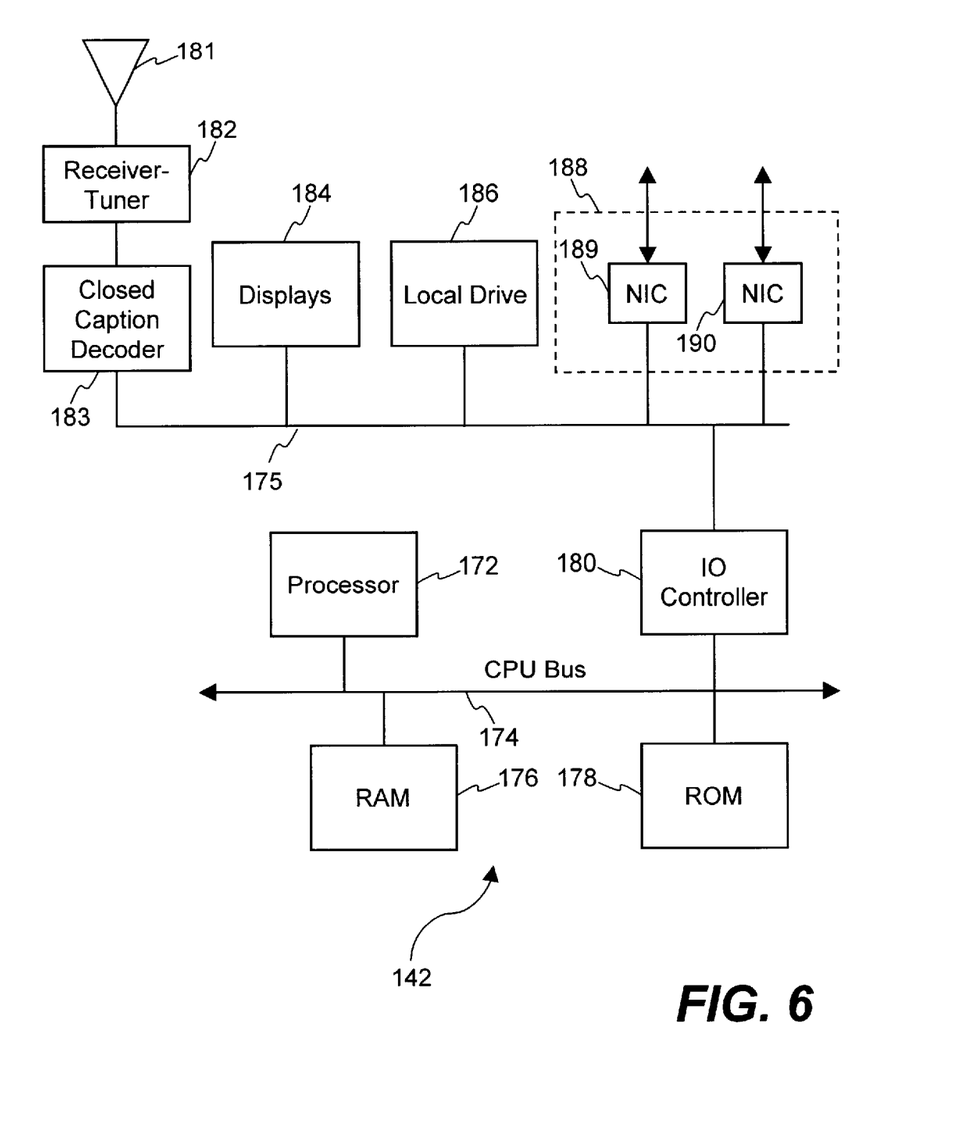
FIG. 6 is a block diagram illustrating a computer node of the computer system of the present invention.

FIG. 6 illustrates the computer 142 in more detail. The computer 142 has a processor 172 which is connected to a processor bus 174. The processor 172 communicates with a random memory access (RAM) 176 and a read-only memory (ROM) 178 over the CPU bus 174. Additionally, the processor 172 communicates with one or more peripheral devices through an I/O controller 180 which is connected to the CPU bus 174. The I/O controller 180 in turn provides an I/O bus 172 for communication with a display device 184, a data storage device 186, a telephone interface card 187, and a network interface system 188.

Also connected to the I/O controller 180 is a closed caption decoder 183. The closed caption decoder 183 is connected to a receiver-tuner 182, which can receive over-the-air signals using an optional antenna 181 or can directly receive programs from a wired connection. The receiver-tuner 182 may receive wireless transmissions directed at a direct broadcast satellite (DBS) receiver, a television receiver or a radio receiver, or alternatively, may receive wired transmissions from sources such as cable or a multimedia source. For example, the multimedia source can be a personal computer, a laser disc player, a videotape player, a digital video disk (DVD) player, and optical disk or a magnetic data storage device such as a hard disk. Further, the multi-media source can be a network source or a remote source connected to the computer of FIG. 6 using an IEEE-1934 bus (FireWire). The closed caption decoder 183 may be a Model PDR-885, which is a Closed Caption Encoder with an integral Decoder for inserting caption and text data on Line 21 of the NTSC signal and which is available from Computer Prompting & Captioning Co. of Rockville, Md. Caption and Text data may be inserted in either field on lines 10 though 25 of the Vertical Blanking Interval (VBI). In addition, data on the incoming video signal may be recovered from either field, lines 10 through 25 of the VBI. This incoming data may be displayed as Open Captions, using the built-in Closed Caption Decoder, and captured by a computer utilizing the PDR-885's serial data port. Each of these functions, Encoding, Decoding, and Data Recovery may be done simultaneously.

The telephone interface card 187 may be a D/21H or a D/41H voice board, available from Dialogic Corporation of Parsippany, N.J., and which may support digital SS7, digital E&M, digital loop start, digital DID, analog E&M, analog loop start, and analog DID. Each of the two (D/21H) or four (D/41H) loop start interfaces receives voice and telephony signaling information from the telephone network. Generally, using the interface, analog signal from the cellular switch 100 or 140 is bandpass-filtered and conditioned by the line interface and then applied to a CODER/DECoder (CODEC) circuit. The CODEC filters, samples, and digitizes the inbound analog signal and passes this digitized signal to a digital signal processor (DSP). The DSP then uses Automatic Gain Control to compensate for variations in the level of the incoming analog signal, applies an adaptive differential pulse code modulation (ADPCM) or pulse code modulation (PCM) algorithm to compress the signal and save disk storage space. The DSP also detects the presence of tones—DTMF, MF, or an application defined single- or dual-frequency tone. Thus, inbound telephony signaling (ring detection and loop current detection) are conditioned by the line interface and routed over a control bus to the DSP. The DSP responds to these signals, informs the application of telephony signaling status, and instructs the line interface to transmit outbound signaling (on-hook/off-hook) to the telephone network. When recording speech, the DSP can use different digitizing rates from 24 to 64 kilobits per second (Kb/s) as selected by the application for the best speech quality and most efficient storage. The digitizing rate is selected on a channel-by-channel basis and can be changed each time a record or play function is initiated.

Outbound processing is the reverse of inbound processing.

The DSP processed speech is transmitted to the host processor for storage purposes. When playing back a stored file, voice information is received from the host processor and sent to the DSP, which converts the file into digitized voice. The DSP sends the digitized voice to the CODEC to be converted into analog voice and then to the line interface for transmission to the telephone network. For outbound data, the DSP expands stored, compressed audio data for playback; adjusts the volume and rate of speed of playback upon application or user request; and generates tones—DTMF, MF, or any application-defined general-purpose tone.

The network interface system 188 has a plurality of network interface cards 189–190. The network interface system 188 may be a NETELLIGENT® 10/100 TX PCI INTEL® UTP Controller, available from Compaq Computers Corporation of Houston, Tex. The Netelligent 10/100 unit can operate at 10 or 100 megabits per second (Mb/s) and automatically negotiates to the highest common speed when connected to a network. It has a network fault tolerance feature which enables its Controller to keep an active link by automatically switching to a backup network interface if a network connection fails.

Software components executing on the computer of FIG. 6 includes a decoder for separating the audio component and the text component from the signal stream; an audio synthesizer coupled to the decoder for generating an audio pattern representative of the start of the multi-media segment; a pattern recognizer coupled to the decoder and to the audio synthesizer for locating the audio pattern in the audio component; and an aligner coupled to the pattern recognizer and to the decoder for temporally aligning the text with the audio pattern in the audio component.

Figure 7:
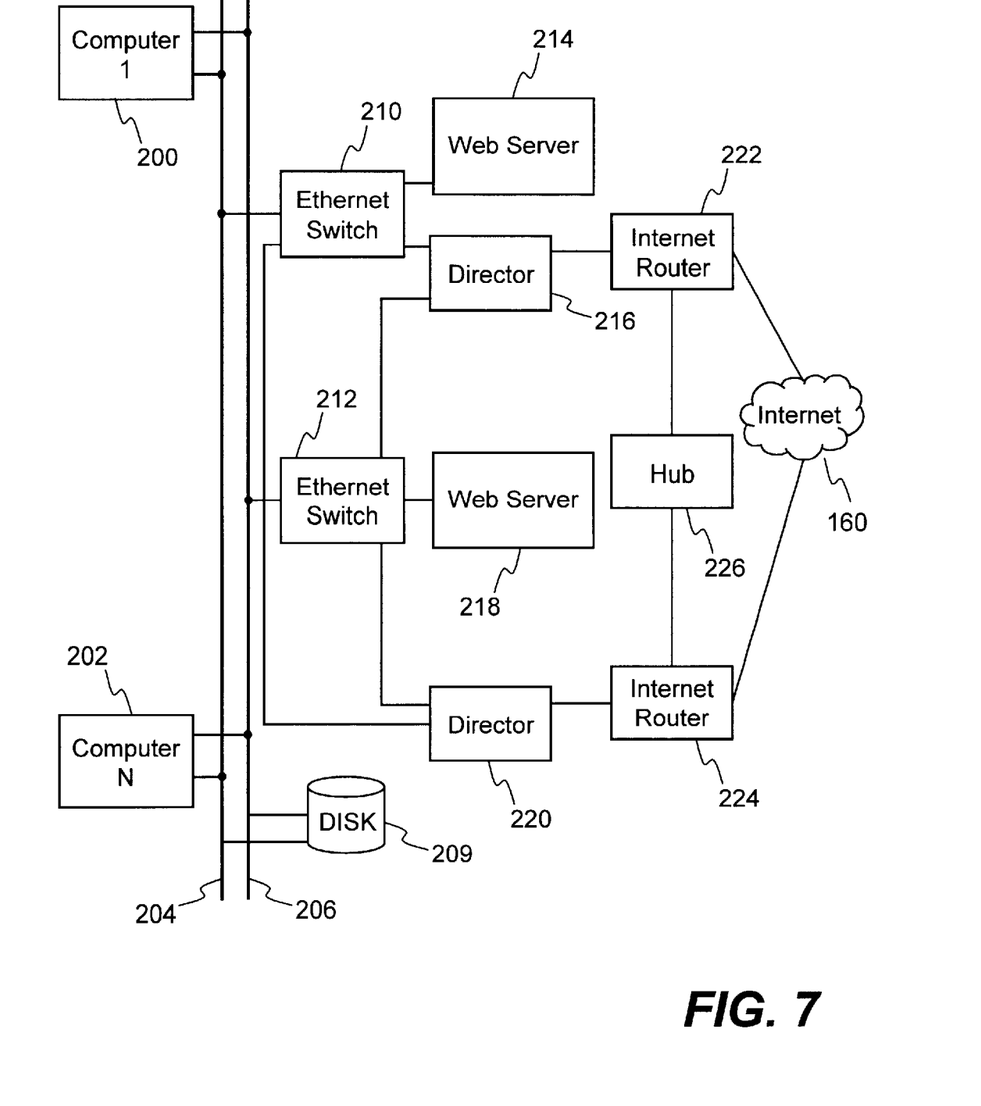
FIG. 7 is a block diagram illustrating a third computer system for processing multimedia segments.

In FIG. 7, another computer system is shown. A plurality of computers 200 and 202 and a disk 209 communicate over a dual bus with a first bus 204 and a second bus 206. Additionally, a first Ethernet switch 210 is connected to the first bus 204. The Ethernet switch 210 may be the CISCO® 2900 switch. The Ethernet switch 210 in turn is connected to an Internet pool of Web servers 214. Servers 214 support Web content retrieval, email, database management, and system management. The Ethernet switch 210 is also connected to a first director 216 as well as a second director 220. The first director 216 in turn communicates with an Internet router 222. The Internet router 222 is also connected to a hub 226 and to the Internet 160.

Correspondingly, a second Ethernet switch 212 is connected to the second bus 206. The second Ethernet switch 212, which may be the Cisco 2900 switch, is also connected to an Internet Web server 218 and to the second director 220. The second director 220 in turn is connected to an Internet router 224 which is connected to the Internet 160. The Internet router 224 is also connected to the hub 226.

Directors recognize a Universal Resource Locator (URL) or Internet Protocol (IP) address as being associated with a pool of servers. If a server becomes unavailable, the server request is simply put in a slow poll mode and server requests are not sent to it until it starts responding. Directors provide various load-balancing algorithms to even out the load among a pool of servers. These devices assure high availability and scalability. By using directors 216 and 220 within such a clustered system, provisioning active/active pools of servers can be provided using off the shelf components to assure scalable, load balanced, fault tolerant access of clients to all server resources.

Figure 8:
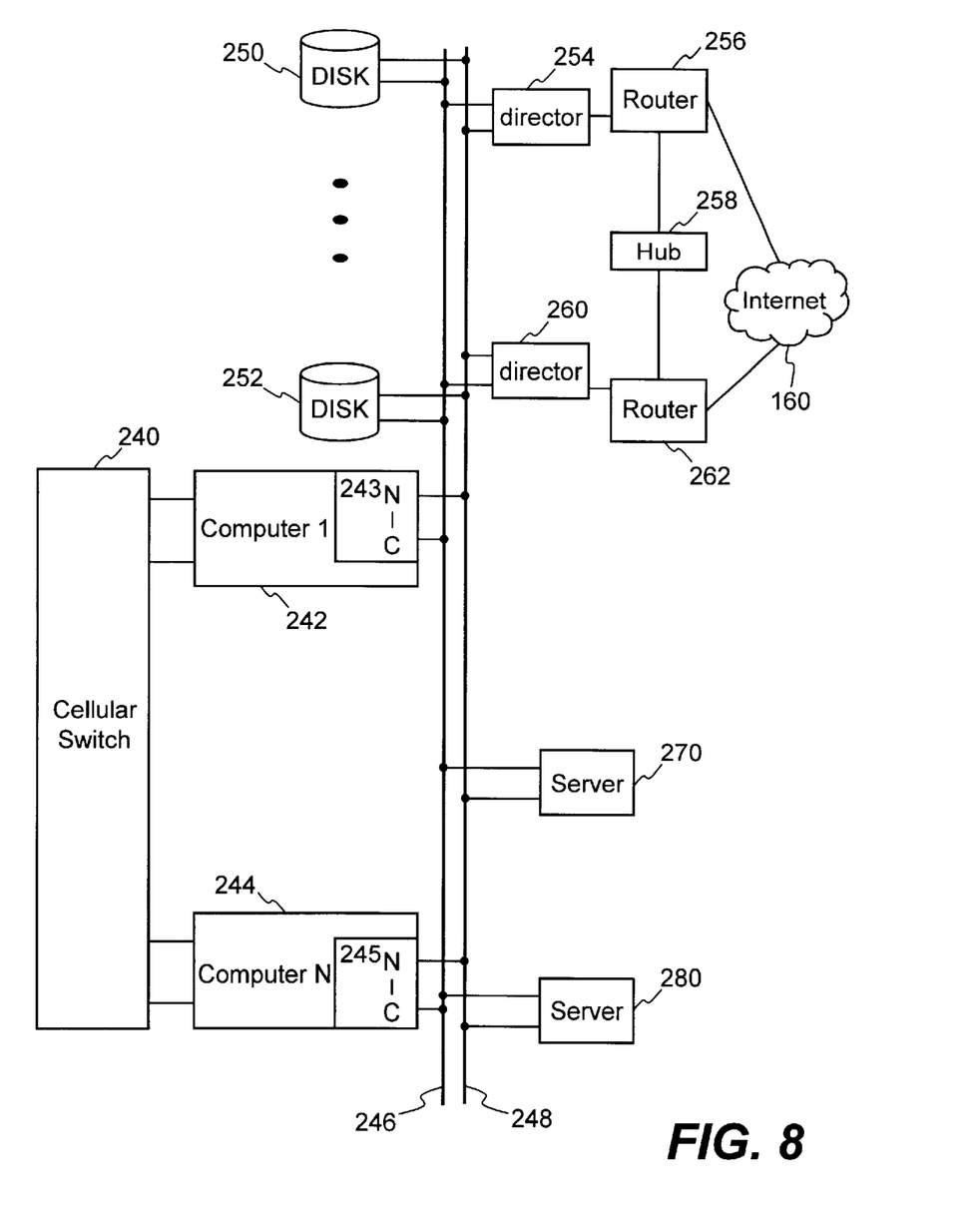
FIG. 8 is a block diagram illustrating a fourth computer system for processing multimedia segments.

FIG. 8 shows yet another embodiment of the invention. Incoming data from the POTS network is received by a cellular switch 240. The cellular switch 240 in turn provides POTS data to computers 242 and 244 over multiple T1 connections for each computer. Each of computers 242 and 244 in turn is connected to a dual backplane system which is made up of a first active backplane 246 and a second active backplane 248. A plurality of servers 270 and 280 are also connected to the first active backplane 246 and second active backplane 248. Similarly, a plurality of data storage devices 250 and 252 are connected to the first active backplane 246 and the second active backplane 248.

Additionally, multiple directors 254 and 260 are also connected to the first active backplane 246 and the second active backplane 248. Each of the directors 254 and 260 is connected to each of routers 256 and 262. The routers 256 and 262 communicate with each other over a hub 258. The routers 256 and 262 are also connected to the Internet 160.

The deployment of the dual backplanes 246 and 248 and directors 254 and 260 allows many servers to perform the same task in an active/active scalable manner. By providing a client process with access to a pool of like servers which are load balanced, the system minimizes the response time for each request.

Figure 9:
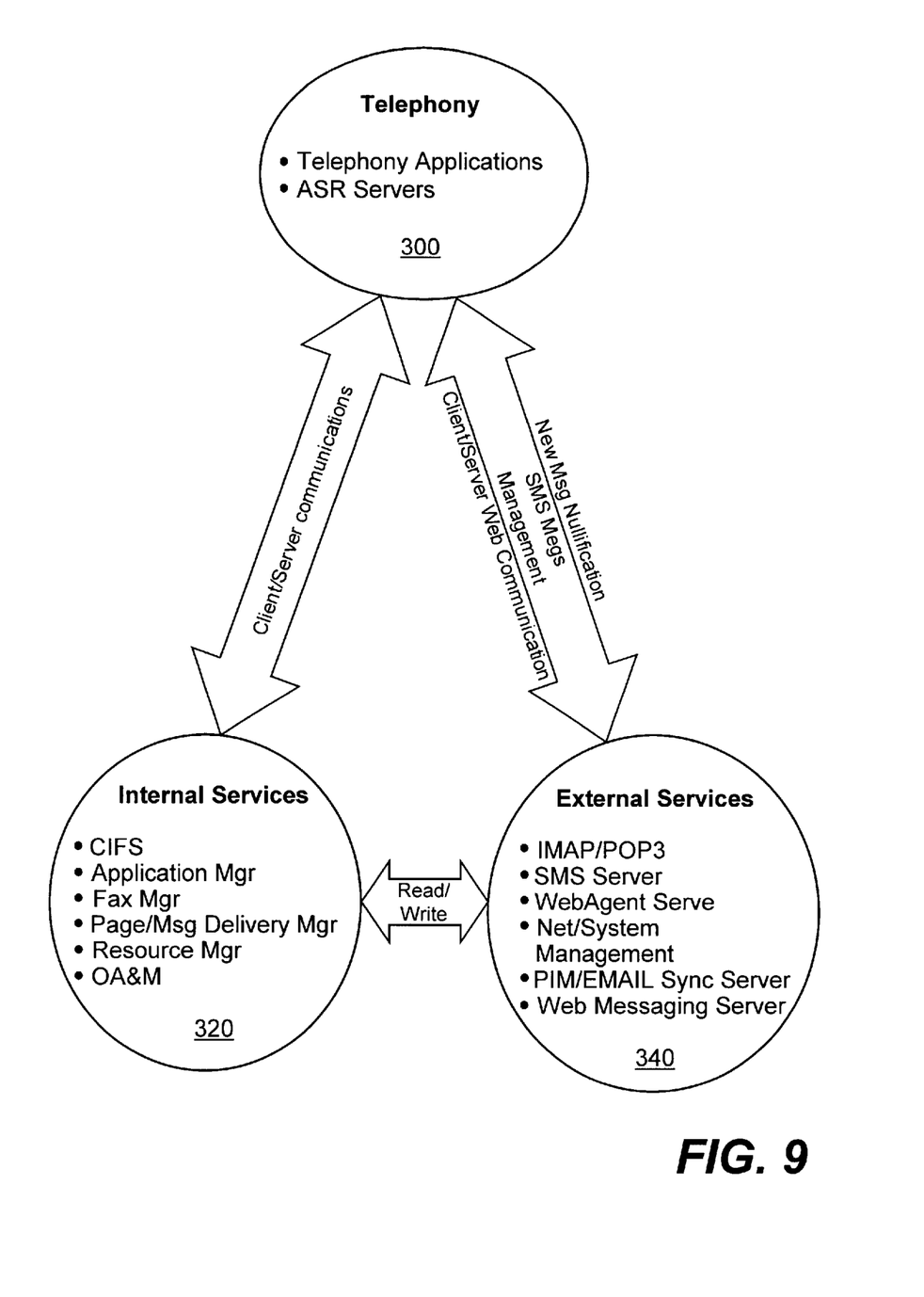
FIG. 9 is a diagram of software supported by the computer system of the present invention.

Turning now to FIG. 9, an overview of processes executing on the computer systems described above are shown. These processes include a telephony process 300 which is a collection one or more telephony application modules and an automatic speech recognition (ASR) server module. In the telephony process 300, multiple client application modules communicate with one or more automatic speech recognition (ASR) client module, one of which is assigned per communication port. The ASR client module in turn communicates with an ASR server which handles the speech recognition task. The ASR server software may be the NUANCE-6® software, available from Nuance Communications of Menlo Park, Calif. The ASR server enables speech recognition applications that allow users to talk to computers as if they were speaking with human agents. The ASR server may utilize linguistic and statistical models to interpret and understand natural human speech to provide high recognition accuracy across a range of devices, languages, applications and vocabularies. The scalable client/server architecture of the system handles call volumes and vocabularies of all sizes while providing high reliability. Additionally, each client module also communicates over a telephony protocol which supports facsimile, text, automatic speech recognition and voice processing.

Telephony application servers use the same file store methods as the electronic mail server. Users send and receive voice and fax messages and convert the electronic mail and Web text to speech using the telephony application. Electronic mail is sent to and from an IMAP4 electronic mail server which uses the same message store as the telephony application. In this way, the user is presented with the abstraction of a unified mailbox and advanced Web services both from the phone as well as the desktop.

When a server for telephony application goes down, all the ports in that node are lost. Since no shared services are implemented in the application servers, no fail-over is required. All ongoing calls on that server are dropped. The bus 204 or 206 will route new calls to the remaining telephony application servers.

The telephony process 300 communicates with an internal services process 320 via client/server communications. In the internal services module 320, a file sharing protocol handler processes requests from client applications so that they can read and write to files or request services from server programs in the computer network. In this case, the file sharing protocol handler is a CIFS handler. By using CIFS locking strategies, system wide resources and queues can be processed locally and in parallel with peer servers such as resource managers, application managers, pager/outdialer managers, and fax managers. The lock technique improves parallelism and scalability while reducing load balancing and fail-over complexity.

The CIFS file protocol handler implements requests from one or more application commands such as allocate and lock. The application manager allocates one or more universal ports, eliminates redundant inbound/outbound requests, and allocates and deallocates universal ports to set up various conference bridges as necessary.

The application manager also communicates with a fax delivery manager and a pager delivery manager. The fax delivery manager maintains fax queues and is aware of the availability of dedicated and/or dynamically allocated dial-out ports. The fax delivery manager is also responsible for retrying fax delivery if necessary. The fax delivery manager communicates with the CIFS software information regarding the fax queue management as well as the fax retrieval process. The pager delivery manager maintains the pager queues and is aware of the dedicated and/or dynamically allocated dial-out ports. It also manages the retry of the pager delivery process. The internal services module 320 also contains a resource manager which allocates the available conference bridges. The internal service module 320 also has a OA&M (Operations, Administration and Maintenance) manager which supports mailbox, port and disk utilities.

The internal services process 320 is a collection of software such as a CIFS application module, an application manager module, a facsimile manager module, a pager and message delivery manager module, a resource manager module, and an operation and administration (OA&M) manager module. The external services process 340 is a collection of services which handle tasks such as Internet Message Access Protocol 4 (IMAP4)/Post Office Protocol 3 (POP3) electronic mail, Short Message System (SMS) server, Web agent server, network and system management module, personal information management/electronic mail synchronization server module, and Web Messaging server module.

The electronic mail server sends and receives messages using IMAP4 and POP3 SMTP protocols. The electronic mail server uses the same file store methods as the telephony application servers, thus supporting the abstraction of a unified mailbox to the phone as well as to the desktop. The Web server implements the Web user interface for message access, service management, system management, PIM synchronization, and Internet data collection. Through ACTIVE-X® and JAVA® applets or scripts, unified messages can be accessed over the Internet using Web browsers such as Microsoft Internet Explorer and Netscape Navigator. The user can use a Web browser to access his or her calendar, address book, and to-do list. The user can also access the Web server from the Internet to add or change services and configure service parameters. With the help of forms and menus, the user may interact with configuration parameters. Further, limited access to service parameters is supported over the telephone user interface.

The Personal Information Manager module manages a user's address book, calendar, and to-do list. An address book may contain entries with fields for name, title, company address, business phone, mobile phone, home phone, fax, electronic mail, Web page address and notes. A calendar may keep track of appointments, with features such as subject/agenda, location, date/time, and appointment length. A to-do list keeps track of things that need to be done. The to-do list entry may provide fields for subject/agenda, priority, due date/time, and reminder notes. The system can page, call or send electronic mail with to-do list content. PIM synchronization over the Web is provided to make information on palm-top computers available to the user at any time anywhere by telephone or Web client access. The Web server is the gateway to handle this synchronization.

The external services module 340 contains an IMAP4/POP3 electronic mail server. The server handles electronic mail consolidation and unifies the mailbox access to the Web. The IMAP4/POP3 server 342 communicates using an LDAP (Lightweight Directory Access Protocol) to an X.500 directory server. LDAP is a standard capable of providing open access to directory services on the Internet, as well as integrating directories and providing a global directory service. X.500 is a standard produced by the ISO/ITU defining the protocols and information model for a global directory service that is independent of computing application and network platform. The X.500 standard defines a specification for a rich, global, distributed directory based on hierarchically named information objects (directory entries) that users can browse and search. X.500 uses a model of a set of Directory Servers (DSAs), each holding a portion of the global Directory Information Base (DIB). The DSAs co-operate to provide a directory service to user applications in a way which means these applications need not be aware of the location of the information they are accessing.

The IMAP4/POP3 server and the X.500 directory server in turn communicates over the Internet. Further, the IMAP/POP3 server communicates with an SMS server. Additionally, the X.500 directory communicates with a personal information management (PIM)-electronic mail synchronization system. The PIM-electronic mail synchronizer in turn communicates with the Internet such that a user can synchronize his PIM and electronic mail over the Internet.

Additionally, the external services module 340 contains a network management module which acts as an interface to the CIFS message store system. The network management module also communicates over the Internet. A system administrator operating the network management module is provided with secure tools to manage the system over the network. Server management, network management, resource management and mailbox management can be all accessed from the Web.

A Web Messaging module can be provided to act as a service provider for various message content presentations. The Web Messaging software also handles user preference configurations stored in the profile for system management and system configuration. Further, the external services module 340 includes a Web agent server which operates in conjunction with a phone agent to process spoken requests from the user for searching or operating applications over the Internet. The phone agent in turn provides commands to a Web methods interpreter. The Web methods interpreter translates the verbal request or command to an Internet search and accesses the Internet appropriately. The user can access Internet data such as stock quotes and weather reports from a cellular phone.

The above processes, in conjunction with the computer systems described above, operate in a fault-tolerant and scalable manner. Further, a pool of servers may execute these processes in an active/active scalable manner. The directors provide load balancing among the pool of like servers. By providing the above processes with access to the pool of like servers which are load balanced, the system provides fast response time for each request.

Each of the above described modules or programs can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Although a computer system with one or more active backplanes have been disclosed, other suitable network architectures may be used. Further, although the present invention has been described with reference to analog television, the invention will also work with Advanced Television (ATV), also known as Digital Television (DTV). ATV, which incorporates the technologies known as High-Definition Television (HDTV) and Standard Digital Television (SDTV). ATV supports new caption features such as multiple caption streams (enabling viewers to choose between different languages or different reading levels), a wider range of character sizes, fonts, and colors, and increased flexibility regarding caption placement. In such an embodiment, multiple language audio streams can be searched and played in response to a user request.

While the invention has been shown and described with reference to particular embodiments, those skilled in the art will understand that the above and other changes in form and detail may be made without departing from the spirit and scope of the following claims.

What is claimed is:

1. A method for retrieving a multi-media segment from a signal stream, the signal stream having an audio component and a closed caption text component, the method comprising:
   separating the audio component and the closed caption text component from the signal stream;
   generating an audio pattern representative of the start of the multi-media segment;
   locating the audio pattern in the audio component; and
   temporally aligning the close caption text component with the audio pattern in the audio component.

2. The method of claim 1, further comprising:
   retrieving the text from the closed caption component; and
   comparing the text against one or more keywords delimiting the multi-media segment.

3. The method of claim 2, wherein the keywords delimit the start and the end of the multi-media segment.

4. The method of claim 2, wherein the keywords are stored in a dictionary.

5. The method of claim 2, further comprising comparing the text from the closed caption text component against one or more key characters delimiting the multi-media segment.

6. The method of claim 5, wherein the key characters are stored in a dictionary.

7. The method of claim 1, further comprising:
   generating a concluding audio pattern representative of the end of the multi-media segment; and
   locating the concluding audio pattern in the audio component.

8. The method of claim 7, further comprising identifying the multi-media segment between the audio patterns.

9. The method of claim 1, wherein the multi-media segment and closed caption text component are indexed are indexed in a database.

10. The method of claim 1, wherein the multi-media segment is played on-demand.

11. An apparatus for retrieving a multi-media segment from a signal stream, the signal stream having an audio component and a closed caption text component, the apparatus comprising:
    means for separating the audio component and the closed caption text component from the signal stream;
    means for generating an audio pattern representative of the start of the multi-media segment;
    means for locating the audio pattern in the audio component; and
    means for temporally aligning the text from the closed caption text component with the audio pattern in the audio component.

12. The apparatus of claim 11, further comprising:
    means for retrieving the text from the closed caption text component; and
    means for comparing the text against one or more keywords delimiting the multi-media segment.

13. The apparatus of claim 12, wherein the keywords delimit the start and the end of the multi-media segment.

14. The apparatus of claim 12, wherein the keywords are stored in a dictionary.

15. The apparatus of claim 12, further comprising means for comparing the text from the closed caption text component against one or more key characters delimiting the multi-media segment.

16. The apparatus of claim 15, wherein the key characters are stored in a dictionary.

17. The apparatus of claim 11, further comprising:

means for generating a concluding audio pattern representative of the end of the multi-media segment; and means for locating the concluding audio pattern in the audio component.

18. The apparatus of claim 17, further comprising means for identifying the multi-media segment between the audio patterns.

19. The apparatus of claim 11, wherein the multi-media segment and the text are indexed in a database.

20. The apparatus of claim 11, further comprising means for playing the multi-media segment on-demand.

21. An apparatus for retrieving a multi-media segment from a signal stream, the signal stream having an audio component and a closed caption text component, the apparatus comprising:

a decoder for separating the audio component and the closed caption text component from the signal stream;

an audio synthesizer coupled to the decoder for generating an audio pattern representative of the start of the multi-media segment;

a pattern recognizer coupled to the decoder and to the audio synthesizer for locating the audio pattern in the audio component; and an aligner coupled to the pattern recognizer and to the decoder for temporally aligning the text with the audio pattern in the audio component.

22. The apparatus of claim 21, further comprising:

a text extractor for retrieving text from the closed caption text component; and a comparator for comparing the text against one or more keywords delimiting the multi-media segment.

23. The apparatus of claim 22, wherein the keywords delimit the start and the end of the multi-media segment.

24. The apparatus of claim 22, further comprising a dictionary for storing the keywords.

25. The apparatus of claim 22, wherein the text from the closed caption text component is compared against one or more key characters delimiting the multi-media segment.

26. The apparatus of claim 25, further comprising a character dictionary for storing the key characters.

27. The apparatus of claim 21, wherein the synthesizer generates a concluding audio pattern representative of the end of the multi-media segment and the pattern recognizer locates the concluding audio pattern in the audio component.

28. The apparatus of claim 27, further comprising a database for storing the multi-media segment between the audio patterns and the text.

29. A method for retrieving a multi-media segment from a signal stream, the signal stream having an audio component and a closed caption text component, the method comprising:

generating audio patterns representative of the start and the end of the multi-media segment;

locating the audio patterns in the audio component; and delimiting a portion of the audio component between the audio patterns as the multi-media segment.

30. The method of claim 29, further comprising:

temporally aligning the text from the closed caption text component with the start of the delimited audio component portion; and storing the text from the closed caption text component and the delimited audio component portion in a database.

* * * * *